US011483061B2

(12) United States Patent
Pham et al.

(10) Patent No.: US 11,483,061 B2
(45) Date of Patent: Oct. 25, 2022

(54) AGGREGATED SPACE SYSTEM NETWORK

(71) Applicant: MAXAR SPACE LLC, Palo Alto, CA (US)

(72) Inventors: James Pham, San Jose, CA (US); Sherrie Schmit, Sunnyvale, CA (US); William Gray, Santa Clara, CA (US); William Hreha, San Jose, CA (US)

(73) Assignee: MAXAR SPACE LLC, Palo Alto, CA (US)

( * ) Notice: Subject to any disclaimer, the term of this patent is extended or adjusted under 35 U.S.C. 154(b) by 71 days.

(21) Appl. No.: 17/110,127

(22) Filed: Dec. 2, 2020

(65) Prior Publication Data

US 2021/0281317 A1    Sep. 9, 2021

Related U.S. Application Data

(60) Provisional application No. 62/984,942, filed on Mar. 4, 2020.

(51) Int. Cl.
*H04B 7/185*        (2006.01)
(52) U.S. Cl.
CPC ..... *H04B 7/18513* (2013.01); *H04B 7/18519* (2013.01)
(58) Field of Classification Search
None
See application file for complete search history.

(56) References Cited

U.S. PATENT DOCUMENTS

| | | | |
|---|---|---|---|
| 5,589,834 | A | 12/1996 | Weinberg |
| 6,903,681 | B2 | 6/2005 | Faris |
| 7,487,114 | B2 | 2/2009 | Florence |
| 10,111,109 | B2 | 10/2018 | Hreha |
| 10,225,002 | B2 | 3/2019 | Wharton |
| 11,088,757 | B2 * | 8/2021 | Agarwal ............. H04B 7/2041 |
| 2008/0103795 | A1 | 5/2008 | Jakubowski |
| 2008/0109306 | A1 | 5/2008 | Maigret |

(Continued)

OTHER PUBLICATIONS

Pham et al., "Aggregated Space System Network," U.S. Appl. No. 62/984,942, filed Mar. 4, 2020.

(Continued)

*Primary Examiner* — Shripal K Khajuria
(74) *Attorney, Agent, or Firm* — Vierra Magen Marcus LLC

(57) ABSTRACT

A system for aggregating spaced related systems includes accessing service provider information for multiple service providers to determine relevant services/systems available, automatically determining that no single service provider provides services sufficient to perform a particular space activity, automatically identifying multiple services from different service providers that in aggregate include performing the space activity, and automatically determining a parameter to configure space equipment to perform each of the multiple services from the different service providers in order to perform the space activity. In some embodiments, this system can be scaled across multiple regions (e.g., multiple planetary regions). For example, each region can have its own set of servers and ledgers that provide real-time services within the region and opportunistically synchronize between regions (e.g., when communication is available).

20 Claims, 11 Drawing Sheets

(56) References Cited

U.S. PATENT DOCUMENTS

| | | | |
|---|---|---|---|
| 2010/0232431 A1* | 9/2010 | Sebastian | H04N 21/8405 370/390 |
| 2017/0078493 A1 | 3/2017 | Melika | |
| 2018/0317067 A1* | 11/2018 | Ameixieira | H04W 76/10 |

OTHER PUBLICATIONS

Lazaar, et al., Telecommunication Use Cases for Blockchain Technology, vol. 1, Aug. 2019, Enterprise Ethereum Alliance 2019.

* cited by examiner

AGGREGATED SPACE SYSTEM NETWORK

CROSS-REFERENCE TO RELATED APPLICATION

This application claims the benefit of U.S. Provisional Patent Application No. 62/984,942, "Aggregated Space System Network," filed on Mar. 4, 2020, which is hereby incorporated by reference in its entirety.

BACKGROUND

The number of space activities and the number of entities performing space activities has been increasing. For purposes of this document, space activities are functions performed in space. The term "space" refers to being beyond the Earth's atmosphere, in orbit around the Earth, or at a distance from the Earth's surface that is equivalent to (or greater than) a distance of an object in orbit around the Earth. Examples of space activities include communication, transport, solar system exploration and scientific research. For example, the International Space Station is an orbiting research facility that functions to perform world-class science and research that only a microgravity environment can provide. Other activities performed in space can also be considered space activities.

Often, a single entity performing a space activity will develop and implement the entire system needed to perform the space activity. For example, one entity may build a constellation of satellites and a plurality of ground terminals to implement a communication system. As space activities become more complex, it is becoming too expensive, risky and complicated for one entity to develop an entire system.

DETAILED DESCRIPTION

Figure 1:
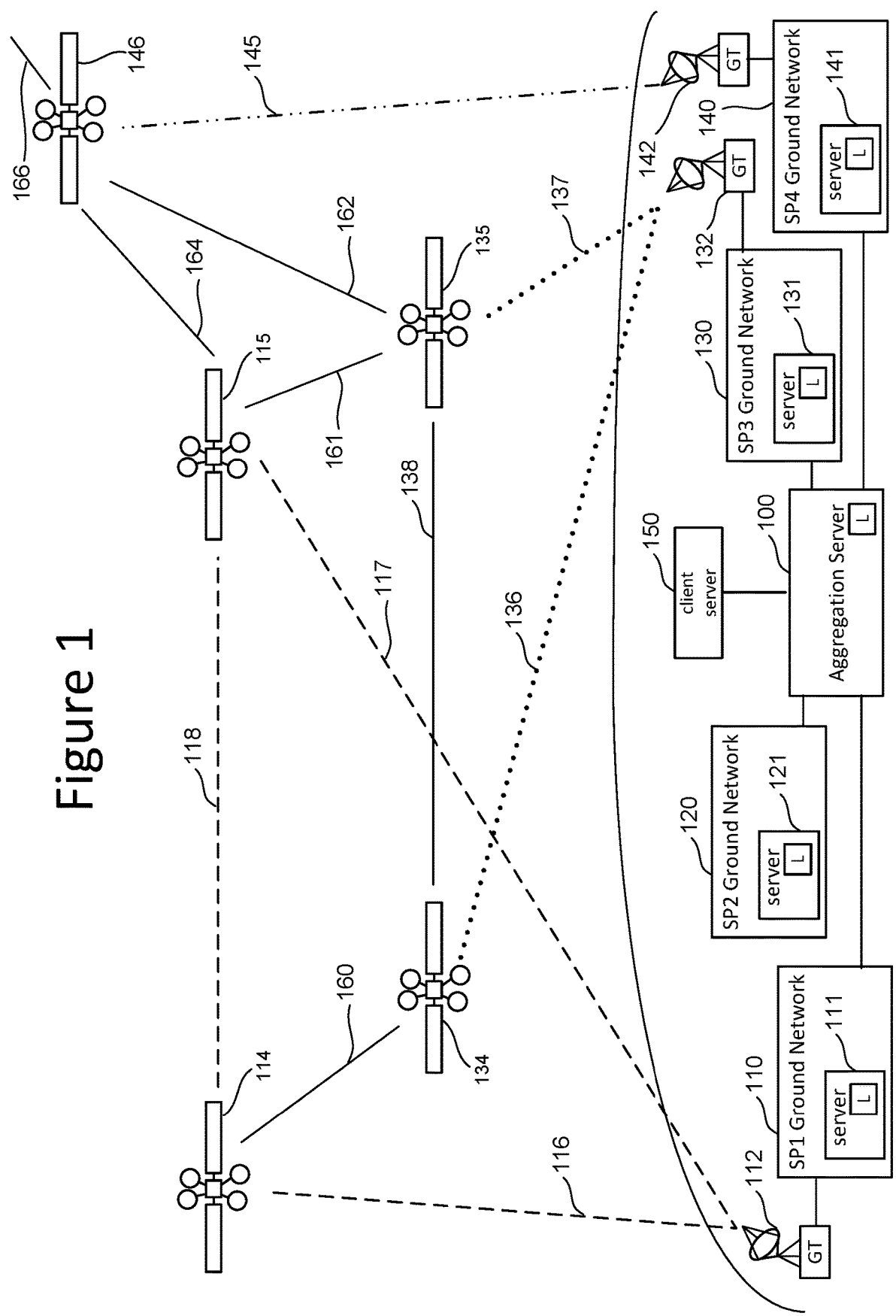
FIG. 1 is a block diagram of one embodiment of a space system that aggregates multiple systems/services to perform a space activity.

To reduce costs, risks and complications of deploying large scale systems for performing space activities, a lead entity (a client) can aggregate systems/services from multiple providers to support the space activity (the mission). For example, a client can use a spacecraft from a first service provider for transport to/from a location in space; a spaced-based relay station from a second provider for communication between Earth and the location in space; and one or more satellites from a third provider for communication between the relay station of the second provider and ground based terminals, all in support of a space activity such as exploration of a planet, asteroid or moon. However, most spaced related service providers (operators of equipment that perform services in space or in support of activities in space) provide stand-alone solutions with no interoperability, ground and space networks often have separate infrastructures with no shared resources, and it has been historically difficult for spaced related service providers to work together to provide end-to-end solutions.

To enable aggregation of spaced related systems/services, an aggregation system is implemented electronically (e.g., one or more computer servers and, optionally, one or more wired/wireless networks), that allows clients to obtain end-to-end spaced related systems/services in support of a space activity. To successfully implement such a system, various technical problems must be overcome. First, the servers need to identify interoperable services, including determining which space related systems/services from which providers can work together to achieve the mission. This may involve automatic translation of technical performance specifications between different performance metrics, automatic determining of link budgets to verify that communication is possible, and/or automatic configuring of space and/or ground equipment to use the aggregated systems/services to perform the space activity. Second, the servers need to provide appropriate security, while balancing transparency. For example, to record information about the aggregation of systems/services, ledgers can be used that are secure, distributed and immutable. Additionally, clients can specify security policies regarding how services are performed, including whether the systems/services should be public or hidden. Third, the space systems need should be fault tolerant. For example, the proposed aggregation system can be configured to automatically monitor the space activity, including the various system/services used to perform the space activity, in order to identify faults or other issues. Some embodiments can include automatically reconfiguring the space and/or ground equipment to use the aggregated systems/services differently in order to perform the space activity in light of the detected fault or reconfiguring the space and/or ground equipment to use different space based systems/services in order to perform the space activity.

One embodiment of the system described herein includes one or more servers performing a machine implemented method comprising receiving a request regarding performance of a space activity; accessing service provider information for multiple service providers to determine relevant systems/services available, automatically determining that no single service provider provides systems/services sufficient to perform the space activity, automatically identifying multiple systems/services from different service providers that in aggregate include performing the space activity, and automatically determining a parameter to configure space equipment to perform each of the multiple services (and/or interact with the systems) from the different service providers in order to perform the space activity.

In one example implementation, the request identifies a first quantity for a first performance metric and the automatically identifying multiple services from different service providers that in aggregate include performing the space activity includes: automatically identifying a first space service that specifies a second quantity for a second performance metric that is different than the first performance metric and automatically translating between the first performance metric and the second performance metric to determine whether the second quantity for the second performance metric satisfies the first quantity for the first performance metric; and the automatically determining the parameter includes automatically determining the parameter to configure space equipment to perform the space activity using the first space service such that the first quantity for the first performance metric is satisfied.

These systems described herein can be scaled across multiple regions (e.g., multiple planetary regions). For example, each region can have its own set of servers and ledgers that provide real-time services within the region and opportunistically synchronize between regions (e.g., when communication is available).

FIG. 1 is a block diagram of a space system that aggregates multiple systems/services to perform a space activity. That is, FIG. 1 shows a plurality of interoperable space assets from multiple service providers. In the example of FIG. 1, four separate service providers are depicted; however, more or less than four service providers can also be used. In this example, service provider 1 (SP1) includes a ground network 110 that may comprise computers, mobile telephones, wired networks, wireless networks, ground based satellite terminals, smart appliances, etc., including a server 111 that stores a copy of a ledger L (more details about the ledger are set for the below). Service provider 1 includes two satellites 114 and 115, which may be any type of satellite or spacecraft (e.g., communication satellites, imaging satellites, satellites with sensors, etc.). In one embodiment, satellites 114 and 115 are in geosynchronous orbit; however, other orbits can also be used. The ground network 110 for service provider 1 communicates with satellites 114 and 115 via one or more gateway terminals 112 (or other types of ground based satellite terminals). Gateway terminals 112 communicate with satellite 114 via wireless (e.g., RF or optical) communication link 116. Gateway terminals 112 communicate with satellite 115 via wireless (e.g., RF or optical) communication link 117. In one embodiment, satellite 114 communicates with satellite 115 via wireless (e.g., optical) communication link 118. Wireless communication links 116, 117 and 118 are depicted as dashed lines to indicate that they are all part of a system/service from service provider 1.

Service provider 2 (SP2) includes a ground network 120 that may comprise computers, mobile telephones, wired networks, wireless networks, ground based satellite terminals, smart appliances, etc., including a server 121 that stores a copy of ledger L. In this example, service provider 2 provides space related ground-based equipment and services, but no satellite or other airborne craft.

Service provider 3 (SP3) includes a ground network 130 that may comprise computers, mobile telephones, wired networks, wireless networks, ground based satellite terminals, smart appliances, etc., including a server 131 that stores a copy of ledger L. Service provider 3 includes two satellites 134 and 135, which may be any type of satellite or spacecraft (e.g., communication satellites, imaging satellites, satellites with sensors, etc.). In one embodiment, satellites 134 and 135 are in low earth orbit; however, other orbits can also be used. The ground network 130 for service provider 3 communicates with satellites 134 and 135 via one or more gateway terminals 132 (or other types of ground based satellite terminals). Gateway terminals 132 communicate with satellite 134 via wireless (e.g., RF or optical) communication link 136. Gateway terminals 132 communicate with satellite 135 via wireless (e.g., RF or optical) communication link 137. In one embodiment, satellite 134 communicates with satellite 135 via wireless (e.g., optical) communication link 138. Wireless communication links 136, 137 and 318 are depicted as dotted lines to indicate that they are all part of a system/service from service provider 3.

Service provider 4 (SP4) includes a ground network 140 that may comprise computers, mobile telephones, wired networks, wireless networks, ground based satellite terminals, smart appliances, etc., including a server 141 that stores a copy of ledger L. In some embodiments, a copy of the ledger L will only be maintained by a subset of service providers or by one or more third parties (in addition to or in lieu of all or a subset of service providers). Service provider 4 includes one relay station 146 for relaying communication between Earth and a distant planet, moon, or region of the solar system (see communications link 166). In one embodiment, relay station 146 is further from the Earth's surface then geosynchronous orbit. In some embodiments, relay station 146 is not orbiting the Earth and is outside the Earth's atmosphere (and/or outside the Earth's gravitational pull). The ground network 140 for service provider 4 communicates with relay station 146 via one or more gateway terminals 142 (or other types of ground based satellite terminals). Gateway terminals 142 communicate with relay station 146 via wireless (e.g., RF or optical) communication link 145.

FIG. 1 shows aggregation server 100 in communication with ground network 110, ground network 120, ground network 130 and ground network 140. In one embodiment, aggregation server 100 comprises one or more computers that is/are programmed by software to perform the processes described herein. For example, aggregation server 100 includes one or more processors connected to a non-transitory computer readable storage medium storing software code which when executing on the one or more processors performs the processes described herein. Examples of the non-transitory computer readable storage medium includes a solid state drive, a hard disk drive, DRAM. SRAM, flash memory, a CDROM, etc. The one or more processors are also connected to communication interfaces for wired and wireless communication, as described herein. Examples of communication interfaces includes an Ethernet interface, a WiFi interface, Bluetooth interface, etc. As depicted in FIG. 1, and explained in more detail below, aggregation server 100 maintains a copy of ledger L.

FIG. 1 shows client server 150 in communication with aggregation server 100. Aggregation server 100 communicates with client server 150 and ground networks 110/120/130/140 via public networks (e.g., the Internet) and/or private networks (e.g., private LAN, direct link or other network/link). FIG. 1 depicts aggregation server 100 and ground networks 111, 121, 131, and 141 positioned on (or near) the surface of the Earth, while satellites 114, 115, 134, 135 and 144 are in space.

An example entity wishing to perform a space activity uses client server 150 to communicate with aggregation server 100 in order to aggregate spaced related systems/ services. Many different space activities can be performed, and can be used with the technology proposed herein. One example is an entity exploring another planet, such as Jupiter. The example entity builds a spacecraft that travels to and subsequently orbits Jupiter for purposes of scientific research regarding Jupiter. However, the example entity does not have the infrastructure to perform high speed communication between Jupiter and Earth, transmit that communication to different regions of Earth that are far from each other (including different hemispheres), and manage the large amounts of data generated during the exploration of Jupiter. Therefore, the example, entity uses client server 150 to communicate with aggregation server 100 in order to aggregate spaced related systems/services from multiple entities to perform the functions needed by the example entity.

Upon (and in response to) receiving the request from client server 150, aggregation server 100 accesses service provider information for multiple service providers (e.g., for SP1, SP2,SP3, SP4, etc.) to determine relevant services/systems available. This service provider information can include an identification of each service provider, an indication of all services provided by each service provider, the technical specifications of all services provided by each service provider, and cost information. The technical specifications can include (but is not limited to) location, bandwidth, power, modulation, code rate, etc. Based on the service provider information, for this example, aggregation server 100 automatically (e.g., without human intervention) determines that no single service provider (by itself) provides services sufficient to perform all of the functions needed by the example entity so that the example entity can complete its exploration of Jupiter (the space activity). Thus, aggregation server 100 automatically identifies multiple services from different service providers that in aggregate allow for the exploration of Jupiter by the example entity. For example, aggregation server 100 automatically identifies that service provider 4 includes relay station 146 that can be used to communication between Earth and Jupiter via interplanetary communications link 166. Aggregation server 100 also identifies that service provider 1 includes satellites 114 and 115 for transmitting communications to different regions of Earth that are far from each other (including different hemispheres) and service provider 3 includes satellites 134 and 135 for transmitting communications to different regions of Earth that are far from each other (including different hemispheres). Depending on the coverage areas of satellites 114/115 and satellites 134/135, aggregation server 100 may choose either service provider 1 or service provider 3 to provide the services of transmitting communications to different regions of Earth. In one set of embodiments, aggregation server 100 may choose both service provider 1 and service provider 3 to meet bandwidth and location demands. Aggregation server 100 also identifies that service provider 2 includes a ground network 120 that includes server farms for storing data on behalf of the example entity and parallel processing centers to process the data generated while exploring Jupiter and transmitted to Earth via relay station 146 and stored in a server farm that is part of ground network 120.

Aggregation server 100 combines the services from the different service providers to create a larger system of space vehicles, computing devices, communications equipment, etc. Aggregation server 100 verifies compatibility between the various services. For example, aggregation server 100 automatically determines one or more parameters to configure space equipment and ground equipment to perform each of the multiple services from the different service providers (without conflict between services) in order to perform the space activity as a whole.

Aggregation server 100 also maintains ledger L as a series of records arranged as a block chain, where each record corresponds to a transaction and identifies a service provider, a service, a security policy, a service level agreement and other contract terms. Copies of ledger L are also separately maintained at other servers. FIG. 1 shows each of the service providers maintaining a copy of ledger L; however, in other embodiments less than all service providers maintain a copy of ledger L. Alternatively (or in addition), copies of ledger L can be maintained by computing systems that are not part of a service provider.

Figure 2:
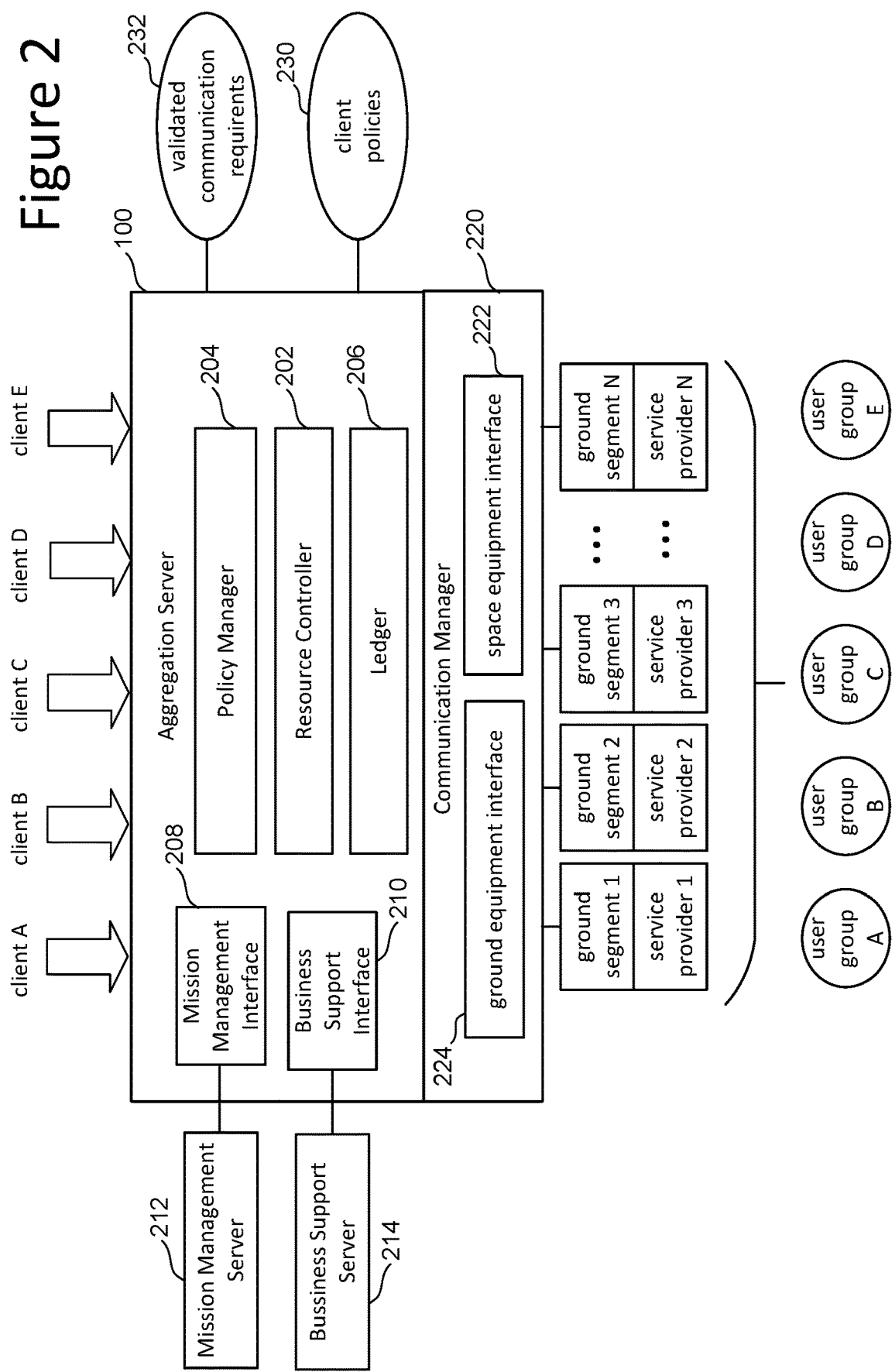
FIG. 2 is a block diagram of one embodiment of an aggregation server.

FIG. 2 is a block diagram that depicts more details of aggregation server 100. In one embodiment, each of the components of aggregation server 100 depicted in FIG. 2 comprise software/code that is stored on a non-transitory computer readable storage medium and, when executing on one or more processors of aggregation server 100, implements the functions described herein to perform the methods described herein. This software includes a resource controller 202, policy manager 204, ledger 206, mission management interface 208, business support interface 210 and communication manager 220 (including ground equipment interface 224 and equipment interface 222). For example, resource controller code implements the resource controller 202, ground equipment interface code implements the ground equipment interface 224, space equipment interface code implements the space equipment interface 222, policy management code implements the policy manager 204, mission management interface code implements the mission management interface 208 and business support interface code implements business support interface 210.

Resource controller 202 is the central processor that is responsible for core operations of the aggregation server, including interfacing with service providers (e.g., service provider 1, service provider 2, service provider 3, . . . service provider N), figuring out what is available and how to use it. Resource controller 202 is configured to receive a request regarding performance of a space related activity, access service provider information for multiple service providers to determine relevant services available, and identify one or more services from one or more different service providers that in aggregate include performing the space related activity. The resource controller will create and implement interfaces between systems of different service providers, set up handovers between satellites of different providers, and ensure that desired performance metrics are met.

Policy manager 204 is in communication with resource controller 202 and, as will be described in more detail below, restricts services that can be used by resource controller 202 (and other entities) based on sharing policies, usage policies and personnel policies (as well as other types of policies).

Ledger 206 include a ledger in the form of a data structure and the software to manage that ledger. In one embodiment, the ledger implements blockchain technology and comprises a set of linked records. Each record identifies a transaction for a space system/service and contains a hash of a previous record to prevent records from being manipulated after committing. Copies of the ledger are maintained at a set of servers in the network so that a record is committed in the ledger only with validation from and storage in ledgers of other servers of the set of servers in the network.

Communication manager 220 enables and manages communication between aggregation server 100 and the various service providers. In one embodiment, communication manager comprises ground equipment interface 224, which is in communication with the resource controller 202 and ground equipment that may or may not communicate with equipment in space. Communication manager 220 also includes space equipment interface 222, which is in communication with resource controller 102 and equipment in space.

Mission management server 212 is an external computing device that is used to manage a space based mission. For example, a client may implement a mission management server 212 to manager that client's space activity (e.g., exploration of Jupiter). Mission management interface code is in communication with resource controller 100 and external mission manager server 212.

Business support server 214 is an external computing device that is used to compute, track, store and report business analytics for one or more missions. Business support interface 210 is in communication with resource controller 100 and business support server 212.

Aggregation server 100 electronically receives requests from clients (e.g., client A, client B, client C, client D, client E) to aggregate systems/services from one or more service providers (e.g., service provider 1, service provider 2, service provider 3, . . . service provider N). Service provider 1 includes its own ground network 1, service provider 2 includes its own ground network 2, service provider 3 includes its own ground network 3, and service provider N includes its own ground network N. All of the ground networks 1-N are in communication with aggregation server 100 via ground segment interface 224 of communication manager 220.

Once aggregated, the aggregated systems/services can be utilized by users (e.g., user group A, user group B, user group C, user group D and user group E). In one embodiment, a user group is an aggregation of assets under a single user authority with a single policy. The system allows users to request services with ease, and permit the system to provide high availability and robustness in a manner consistent with policy. The assets in a User Group are administrated through the aggregation server 100 and governed by rules originated from this owner/authority with the priorities and rules managed by the policy manager 204 and contracted with each of the service providers that are providing part/all of the services.

In one embodiment, user group A utilizes aggregated systems/services from one or more service providers in response to a request from client A as part of performing a space activity, user group B utilizes aggregated systems/services from one or more service providers in response to a request from client B as part of performing a space activity, user group C utilizes aggregated systems/services from one or more service providers in response to a request from client C as part of performing a space activity, user group D utilizes aggregated systems/services from one or more service providers in response to a request from client D as part of performing a space activity, and user group E utilizes aggregated systems/services from one or more service providers in response to a request from client E as part of performing a space activity.

FIG. 2 shows the stakeholders and the flow of agreements between organizations facilitated by the resource controller 202 and policy manager 204. Each Policy Authority and the Service Providers, through the aggregation server 100, must agree on the policies pertaining to that authority's User Group and assets. The Service Providers and User Groups agree to policies which include classification, allowable User Group to Service Provider system connectivity, service priority, recovery priority, desired SLA terms, and which users are trusted for sharing. The policy manager 204 manages these policies and provides them to the resource controller 202, which pushes the appropriate policies out to the service provider's systems including the space networks, ground networks, and terminals. The User Group issues credentials to employees that use information, and the resource controller 202 is aware of cross-User Group credentials.

Figure 3:
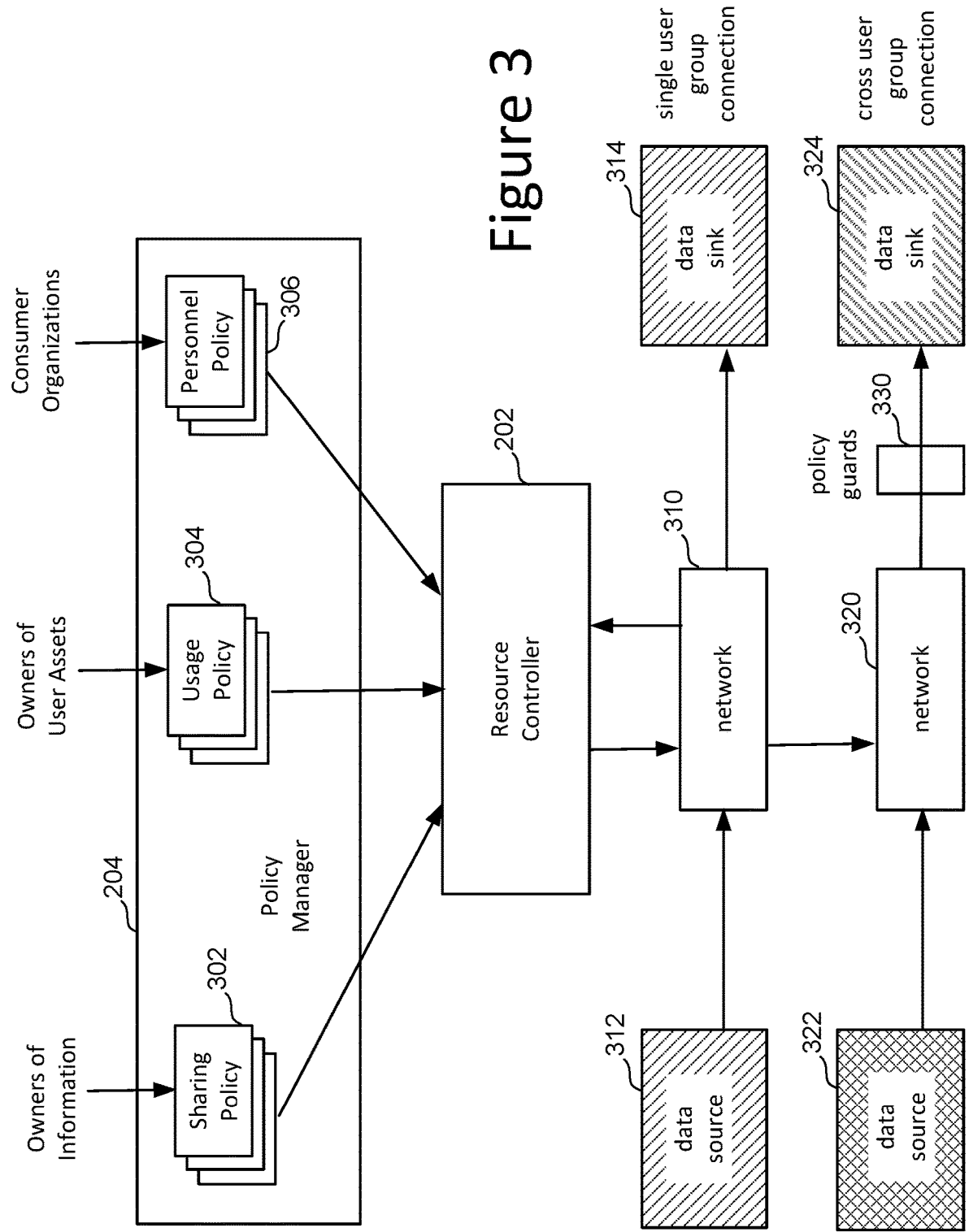
FIG. 3 is a block diagram describing one embodiment for implementing a policy manager of the aggregation server.

FIG. 3 shows an example of how a mission with security requirements could be met for a single User Group connection and one for a cross User Group connection. Policy Manager 204 stores sharing policies 302, usage policies 304 and personnel policies 306. Other types of polices can also be stored and managed. Sharing policies 302 (in one embodiment provided by owners of information stored/managed by a system/service) identify how users of a system/service can share that system/service with other users outside their User Group. Usage policies 304 (in one embodiment provided by owners of user assets that operate with a system/service) identify what actions can be taken by a user group with respect to a system/service. Personnel policies 306 (in one embodiment provided by consumer organizations) identify which users and/or user groups can access a system/service. For the users of the system, trust flows from accrediting organizations through stakeholders to principals who are executing missions. The stakeholders consists of the owners of the information, the owners of the assets, and the consuming organizations personnel. User Groups usually have their own terminals, personnel and policies. User Groups may accredit other User Groups that it is willing to share information with which means that the target organization has been examined and determined trustworthy for connections, possibly with guards. Policy manager 204 manages these policies 302, 304, and 306 and provide them to the resource controller 202. Resource controller 202 aggregates and provisions systems/services in a manner that complies with the policies 302, 304, and 306 provided by policy manager 204.

For example purposes, FIG. 3 shows two data sources 312 and 322, two networks 310 and 320, and two data sinks 314 and 324. More or less than two data sources, networks and data sinks can be implemented. The data source 312 and the data sink 314 are owned or controlled by a single entity associated with the single use group; therefore, in this example the policy governing use of the service provider network 310 and data source 312 allows the single user group associated with the data sink 314 full unrestricted access to the data from data source 312. At the same time (e.g., simultaneously or at overlapping times) that the single user group associated with the data sink 314 has access to the data from data source 312 (via network 310), another user group associated with the data sink 324 has some access the data from data source 322 (via network 320). However, data source 322 is associated with a first user group and data sink 324 is associated with a second user group, thus connection of the data sink 324 to data source 314 is a cross group connection that is governed by a policy managed by policy manger 204 and implemented by resource controller 202. For example, FIG. 3 shows policy guards 330 implemented in the connection of the data sink 324 to data source 314. Although policy guards 330 is depicted as a rectangle in the connection, that depiction is symbolic as (in one embodiment) the policy guards 330 will be implemented by resource controller 202. Examples of policy guards 330 include restriction on individuals who can access information, time periods that the information can be accessed, geographic locations in which the information can be accessed, etc.

Figure 4:
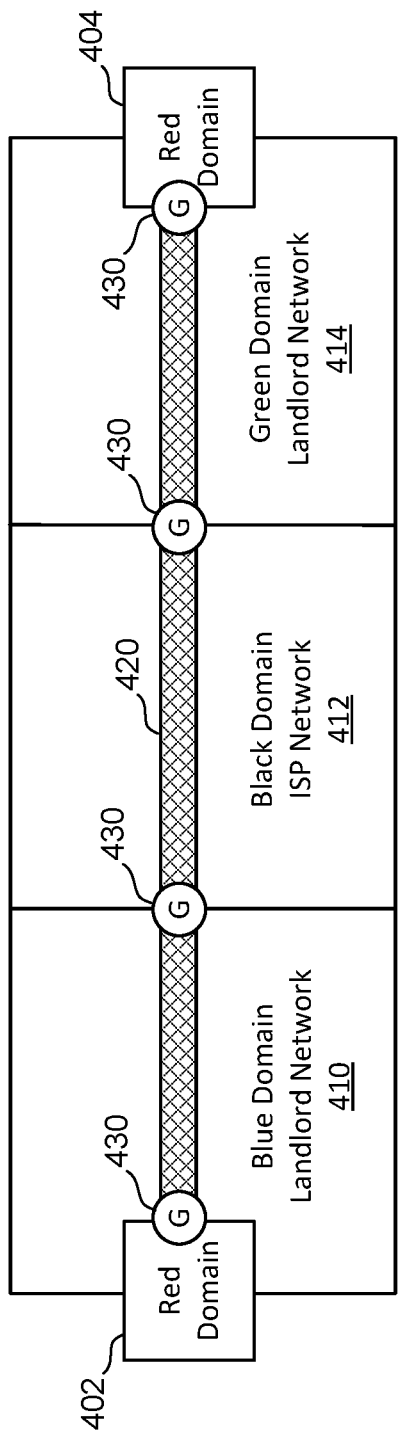
FIG. 4 depicts four domains and an example of implementing a policy.

FIG. 4 depicts four domains and an example of implementing a policy between users crossing multiple domains. FIG. 4 shows four domains (each comprising multiple computers/clients) including the Red Domain (comprising two separate locations 402 and 404), the Blue Domain 410 (e.g., a Landlord Network), the Black Domain 412 (e.g., an ISP Network), and a Green Domain 414 (e.g., a Landlord Network). At the border between domains are guards G (also called gateways or routers), which manage messages passed between domains. As an example, a policy managed by policy manager 204 indicates that users in Red Domain 402 can set up a Virtual Private Network ("VPN") to users in Red Domain 404. Resource controller 202 will set up a secure communication link as a VPN 420 that tunnels through Blue Domain 410, Black Domain 412 and Green Domain 414 (e.g., VPN 420 is established between Landlord Networks).

Policy manager 204 manages policy to define the level of trust between User Groups. User Groups manage their own key material, and resource controller 102 administers VPN tunnels to facilitate communication between User Group guards. When providing connectivity between subnets at the same classification, the gateway access points on the service provider network must be known to the resource controller 102. The established policy must allow the service provider's network to carry the (possibly encrypted) User Group data, and the User Group must provide the keying material and form the VPN tunnels between the two users. Alternatively, resource controller 102 may form a new information domain between the two guards with VPN tunnels forming in two steps to-and-from the administrative domain.

To provide connectivity services between subnets at different classification, guards may be required at both ends. The access points on the service provider's network must be known to the resource controller 102 to facilitate the forming of guards, and when policy allows, the two information domain User Groups will have common keying material to allow the guards to form a VPN.

Figure 5:
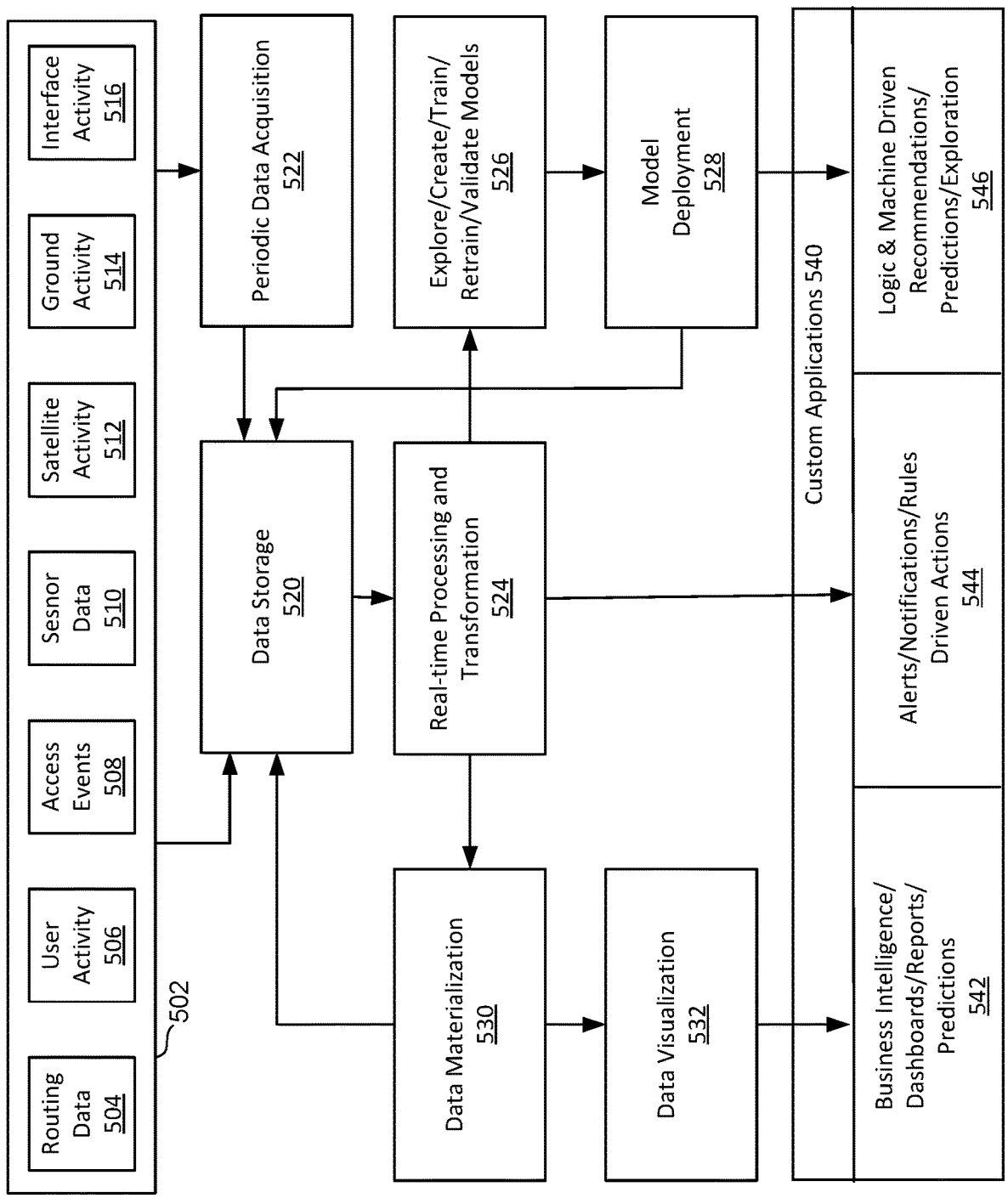
FIG. 5 is a block diagram of an example architecture for one embodiment of the resource controller's data analytics pipeline.

FIG. 5 is a block diagram of an example architecture for one embodiment of software components for resource controller 202. In one embodiment, resource controller 202 comprises a data preparation module 502 that operates on the following data sources: routing data 504, user activity data 506, access event data 508, sensor data 510, satellite activity data 512, ground activity data 514 and interface activity data 516. Data preparation module 502 communicates data to data storage module 520 and periodic data acquisition module 522 (which transmits information to data storage module 520). Real-time processing and transformation module 524 is in communication with data storage module 520, Explore/Create/Train/Retrain/Validate Models module 526, data materialization module 530 and custom applications 540. Data materialization module 530 sends output to data visualization module 532, which outputs to custom applications 540. Explore/create/train/retrain/validate models module 526 provides models to model deployment model 528, which sends output to data storage module 520 and custom applications 540. In one embodiment, custom applications 540 includes business intelligence/dashboards/reports/predictions applications 542, alerts/notifications/rules driven actions applications 544, and logic & machine driven recommendations/predictions/exploration applications 546.

The software modules depicted in FIG. 5 (and executing on resource controller 202) comprise a data analytics pipeline. Data ingestion is the first tier in the data analytics pipeline and is the entry point for bringing data into the system. FIG. 5 depicts a subset of possible data sources (504-516) and the components to systematically store the big data into a distributed data store 520. Real-time processing and transformation module 524 is used to process and transform raw data and a common query engine within data materialization module 530 provides a high level abstraction for querying data. The distributed event store and messaging system is used for raw data aggregation and serves as a very reliable buffer between various stages in the pipeline.

The distributed event store and messaging system effectively decouples producers and consumers of data, and combined with reliability, security, and efficiency, makes it a great data transportation backbone for stream processing and real-time applications. It's essentially a high throughput distributed system that meets the demands of big data through its ability to scale horizontally by adding more commodity servers. It has the flexibility to ingest data from any connected data sources. One method could be through native or REST producers that programmatically push data to the distributed event store/messaging system and another is through built-in connectors that does it automatically from various external sources such as MongoDB, FTP, etc. Combined with the distributed data stream processing framework, it can be used to track data changes and take action on that data either in real-time or in batches.

The distributed data stream processing framework enables scalable, high-throughput, and fault-tolerant stream processing of live data streams. Data is ingested from the distributed event store/messaging system and can be transformed using complex algorithms like map, reduce, join, and window. Lastly, processed data is pushed out into the distributed database 520.

The distributed database 520 offers superior scalability, and fault tolerance. It offers a robust and expressive interface for modeling and querying data. This is where the common querying engine comes in and brings the simplicity and power of a popular querying language like SQL. SQL is an ANSI/ISO standard language for working with data for not only storing, modifying, retrieving, but also for analyzing data. This common querying language also acts as the bridge between data stored in the distributed database and external applications to analyze the data such as a Business Intelligence software, etc.

The business intelligence tier (elements with red outline) of the data analytics pipeline depicted in FIG. 5 comprises data materialization module 530, data visualization module 532, and custom applications 540, including business intelligence/dashboards/reports/predictions applications 542 which performs extracting, analyzing, and distributing data from the data store to support decision making. It is the first step in the area of data science in which the system explores and attempts to find patterns on new data through rich visualization capabilities provided by the Business Intelligence (BI) software platform. The BI tool primarily serves as the delivery mechanism of the query that is generated by the data stored through the common querying engine of data materialization module 530. This BI tier in the data analytics pipeline produces business dashboards and reports that transform complex data into business insights. This discovery step helps uncover insights that will become the precursor for smarter and rules driven automated actions made possible by next tier in the pipeline, Rule-based System.

Acquired actionable insights from the Business Intelligence tier can then be programmed as rules with custom triggering codes. These programmed rules are essentially human-driven automations through data analytics as opposed to machine learning automation, achieved in the highest tier. They are used for automated decisions and decision support to allow immediate and adequate reaction to external forces made available from data.

A rule-based system is implemented using data preparation module 502, data storage module 520, periodic data acquisition module 522, real-time processing and transformation module 524, and custom applications 540 (including alerts/notifications/rules driven actions applications 544). These components execute a set of instructions or function in response to events or direct invocations. The aggregation server 100, through its serverless architecture, facilitates this use case and provides data scientists with the greatest ease to compose functions to be triggered by any programmable event.

The business intelligence platform of the data analytics pipeline depicted in FIG. 5 has built-in predictive analytics functions such as trend line calculation using linear regression, among others. This uses a complex predictive analytics system that comes equipped as a subset of the machine learning arm of the aggregation server 100.

Machine learning explores the construction of algorithms that can learn from heuristics and make predictions from data. These kind of algorithms are the next step in the strictly static programmed instructions from the previous analytics maturity tiers. It does it by explore/create/train/retrain/validate models module 526 building a model from large sized database of sample inputs (e.g., training a classifier model). Typical machine learning tasks are concept learning, advanced predictive modeling, clustering, and finding useful patterns. The ultimate goal is to improve learning in such a way that it comes automatic so that no human interactions are needed. The built/trained model can be used by model deployment module 528 to classify and/or analyze data from data storage 520. The results of model deployment module 528 using the model on the data is provided to logic & machine driven recommendations/predictions/exploration applications 546 in order to predict performance, problems and/or faults.

The data analytics pipeline collects a wealth of data and produces actionable insights, predictions, and recommendations. In one embodiment, application software in the aggregation server 100 is the vehicle to deliver these analytical outputs and business functionality to the users through rich, interactive UIs and effective user experiences. Example application software in the aggregation server 100 performs both event-driven microservices and serverless architectures. The former is used primarily by software developers to build, run, deploy, and manage the suite of aggregation server 100 full featured applications and the latter is geared towards data analysts and data scientists to compose nested data centric functions that get triggered by data changes or other events.

Microservices are an architectural pattern in which complex applications are composed of small, independent processes that communicate with each other through language-agnostic APIs. To avoid interdependencies, each microservice should have minimal interaction with other microservices that are part of the system. This gives the advantage of independent development, deployment, and scale to the microservices.

Microservices being handled by separate logical development streams makes it easier for a new developer to understand the functionality of a service and ramp up to speed. This is especially useful in an agile environment where the developers can constantly change and there is minimal dependency on an individual/contractor. Code maintenance related tasks are simpler as smaller services are much more readable and easily testable. The system should be contractor independent such that services are isolated from each other and from other contractors' services which reduce coupling to development and deployment lifecycles. The aggregation server 100 may have specific requirements which require specialized expertise that spans across multiple contractors. This microservices model allows a client to efficiently outsource the work to different contractors per specialization. This would be very difficult in a monolithic system because of the interdependency of services. The microservices architecture is technology agnostic, as it eliminates long-term commitment to a single technology stack. Every microservice can be built on a separate technology stack and can be redesigned, replaced, or upgraded independently as they execute in isolation. This means that every microservice can be built using a different (or the same) programming language and use a different (or the same) type of data store which best suits the solution. For example, a logging service can use a slower and cheaper data store, whereas a real-time service can use a faster and more performant data store. This decreases the dependency concerns compared to the monolithic designs and makes replacing services much easier.

The microservices can be fault tolerant. Failure of a service will not impact other parts of the system, which is essential for large, business-critical applications. The decomposed nature of the services also helps with fault isolation and troubleshooting. With proper health monitoring systems in place, a failure of a microservice can be easily identified and rectified without causing downtime to the rest of the application. This also applies to application upgrades. If a newer version of a service is not stable, it can be rolled back to an older version with minimal impact to the overall system. The microservices should be highly extensible. An event driven microservices architecture can securely allow permissioned entities to tap into the flow and event-based communication exchanges between services. This ability empowers contractors to easily develop add-ons and new features on top of existing services without fear of impacting them. For instance, if a notification service is desired to email interested parties when a network failure occurs, the new service can simply subscribe to a network failure event already provided by an existing service and implement the functionality from there. The ability of microservices to be executed as an isolated process decouples it from the constraints around a specific hosting environment. For instance, services can be deployed across multiple cloud providers and/or stacks and across different operating systems. This decouples the technology limitations from the business requirements. Each microservice can be separately versioned, upgraded, and scaled without impacting the rest of the system. This enables running multiple development streams in parallel with independent delivery cycles aligned with the business demands. Microservices, being small and focused on a specific business scenario, improve the opportunity for them to be reused across multiple subsystems. This will provide huge cost savings to the project.

Figure 6:
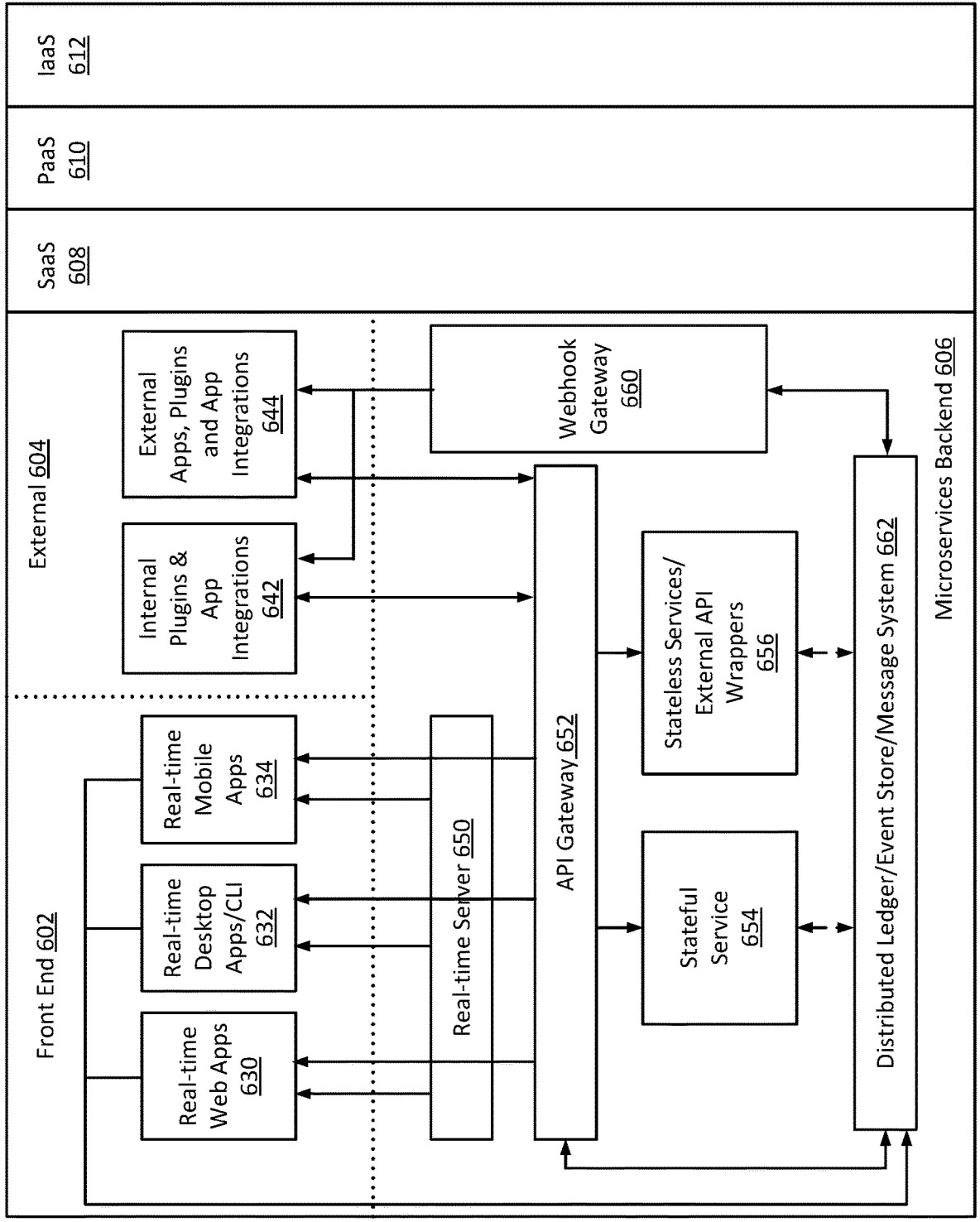
FIG. 6 is a block diagram of an example architecture for one embodiment of the resource controller performing microservices.

FIG. 6 is a block diagram of an example software architecture for one embodiment of components for the resource controller 202 that perform microservices. Each of the components depicted in FIG. 6 are software that programs one or more processor to perform the functions described herein. The components of Microservices Architecture are divided into a front end 602, external set 604 and a microservices backend 606, that when combined are used to implement Software as a Service (SaaS 608), Platform as a Service (PaaS 610) and Information as a Service (IaaS 612).

Front end 602 includes real-time web applications 630, real-time desktop applications 632 and real-time mobile applications 634, all of which are microservices application for a specific mission and provide outputs (e.g., via TCP) to a Distributed Ledger/Event Store/Message System 662 of microservices backend 606. In one embodiment, microservices backend 606 also includes real-time server 650, API gateway 652, stateful service 654 (e.g., includes a data store), Stateless Services/External API Wrappers 656, and webhook gateway 660. Real-time server 650 provides data (e.g., via Websockets) to real-time web applications 630, real-time desktop applications 632 and real-time mobile applications 634. API gateway 652 provides data (e.g., via HTTPS) to real-time web applications 630, real-time desktop applications 632 and real-time mobile applications 634. API gateway also communicates with stateful service 654, Stateless Services/External API Wrappers 656, and Distributed Ledger/Event Store/Message System 662. The external applications 604 include internal plugins & app integrations 642 and external apps, plugins and app integrations 644, both of which are in communication with API gateway 652 and Webhook gateway 660 (e.g., via HTTPS).

The system can implement a serverless architecture, or Functions as a Service (FaaS), which is similar to microservices architecture but it decomposes services even further into many smaller functions. More importantly, it abstracts away the service containerization process altogether, so developers can quickly compose function level codes with any popular programming languages without having to think about the logistics of serving the containers. The developed functions or actions can be triggered through events that can come from the data store 520, real-time processing and transformation module 524 or other applications or sources. The serverless architecture supported by the aggregation server 100 application logic that runs when an event occurs in response to triggers (an event that triggers a certain action to execute). Rules are associated with a trigger to an action. A rule defines what happens when a certain trigger occurs or is fired. An action can be defined in a way such that it is a sequence of multiple actions.

Figure 7:
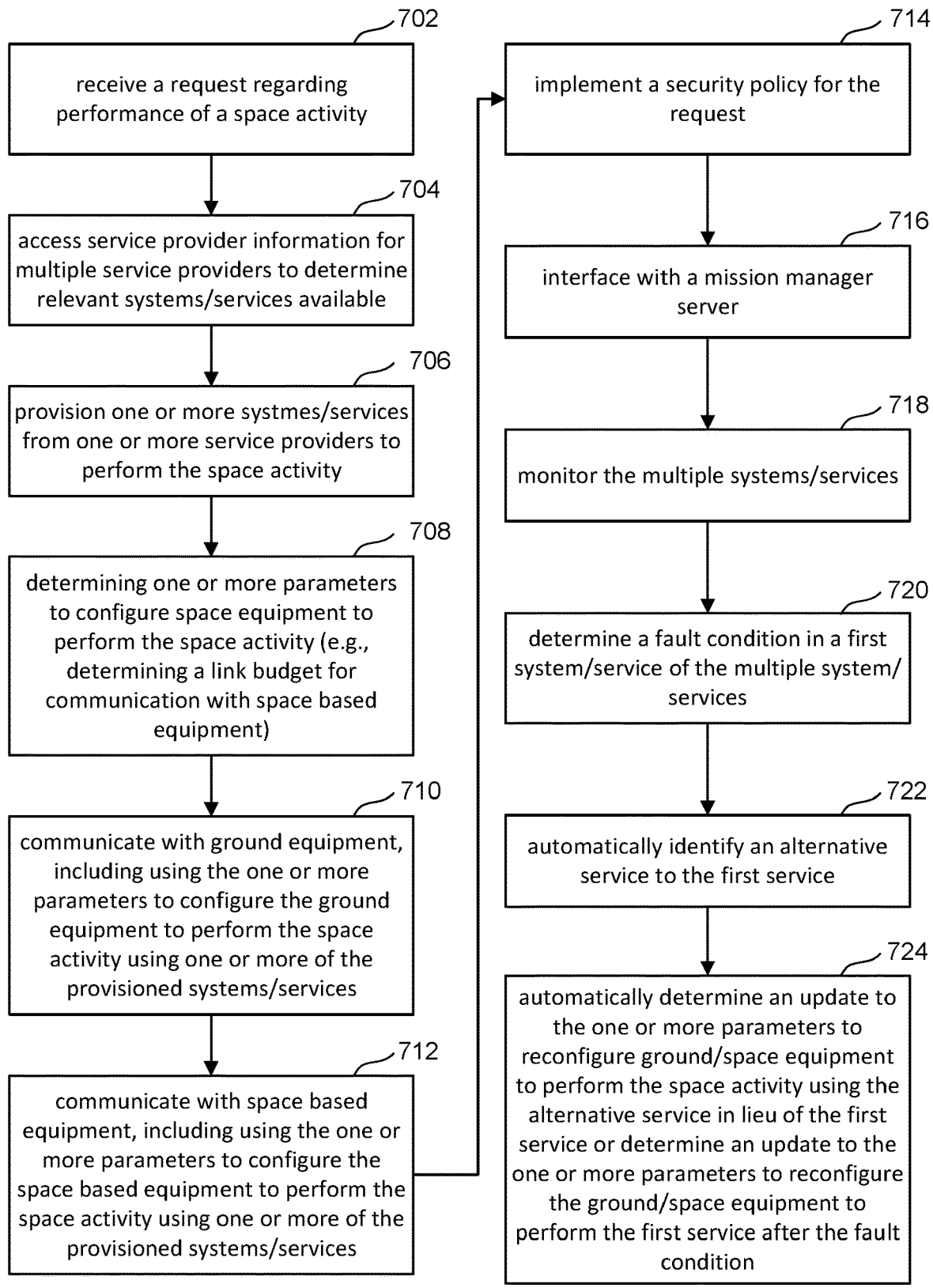
FIG. 7 is a flow chart describing one embodiment of a process for operating the system of FIG. 1.

FIG. 7 is a flow chart describing one embodiment of a machine implemented (automatic) process for operating aggregation server 100 in the system depicted in FIG. 1. In step 702, aggregation server 100 receives a request regarding performance of a space activity. The request can be received via a message, an API, a user interface, etc. For example, the request may include an indication of a space activity to be performed and/or one or more indications of systems/services needed for the space activity. In step 704, aggregation server 100 accesses service provider information for multiple service providers to determine relevant systems/services available. The service provider information includes identification of service providers, the systems each service provider operates, the services available from the service provider, performance metrics for each system or service, and operating details for each system or service. In one embodiment, the service provider information is stored in a data store at or in communication with aggregation server 100. In step 706, aggregation server 100 chooses systems/services from the service provider information that can be used to perform the space activity in accordance with the request received in step 702. Aggregation server 100 provisions the chosen systems/services on behalf of the client submitting the request in step 702.

In step 708, aggregation server 100 determines one or more parameters to configure space equipment to perform the space activity. The one or more parameters can include power, frequency, polarization, modulation rate, error code information, pointing angle, timing information, etc. For an example where the provisioned system/service is a satellite communications link, step 708 may include activity determining a link budget for communication between a satellite and ground terminals, and the above-listed parameters for the satellite and ground terminals to successfully perform the communication. In step 710, aggregation server 100 communicates with ground equipment, including using the one or more parameters to configure the ground equipment to perform the space activity using one or more of the provisioned system/services. In the above example where the provisioned system/service is a satellite communications link, step 710 includes configuring the ground terminals to successfully perform the communication using the above-listed parameters. In step 712, aggregation server 100 communicates with space based equipment, including using the one or more parameters to configure the space based equipment to perform the space activity using one or more of the provisioned systems/services. In the above example where the provisioned system/service is a satellite communications link, step 712 includes configuring the satellite(s) to successfully perform the communication using the above-listed parameters.

In step 714, aggregation server 100 implements a security policy for the request. That security policy is managed by the policy manager 204 and implemented by resource controller 202. For example, the request received in step 702 may include information for a security policy (e.g., no operations may be performed in country X), and that information is provided to policy manager 204. Alternatively, client server 150 may be used to communicate directly with policy manager 204 to provide information (e.g., via an API, a message, etc.) regarding a security policy. In step 716, aggregation server 100 interfaces with a mission manager server 212 (via mission management interface 208) in order to report details of the provisioning and performance of system/services and for receiving additional data or requests from mission manager server 212.

In step 718, aggregation server 100 monitors the multiple systems/services identified and provisioned. For example, each of the systems/services can report back status information to aggregation server 100. Additionally, aggregation server 100 can actively obtain status information by using the systems/services, researching environmental data (e.g., weather, war, natural disasters, etc.), or other means. In step 720, aggregation server 100 determines a fault condition in a first system/service of the multiple system/services. For example, based on reporting or observing performance, aggregation server 100 may determine that a communications link between a first satellite and a region on the Earth is down. In step 722, aggregation server 100 automatically identifies an alternative service to the first service. For example, after determining that the communications link between the first satellite and the region on the Earth is down, aggregation server 100 automatically identifies a second satellite to provide the communications link for the Earth. In step 724, aggregation server 100 automatically determines an update to the one or more parameters to reconfigure the ground equipment and/or the space equipment to perform the space activity using the alternative service in lieu of the first service, or determines an update to the one or more parameters to reconfigure the ground equipment and/or space equipment to perform the first service after the fault condition.

Figure 8:
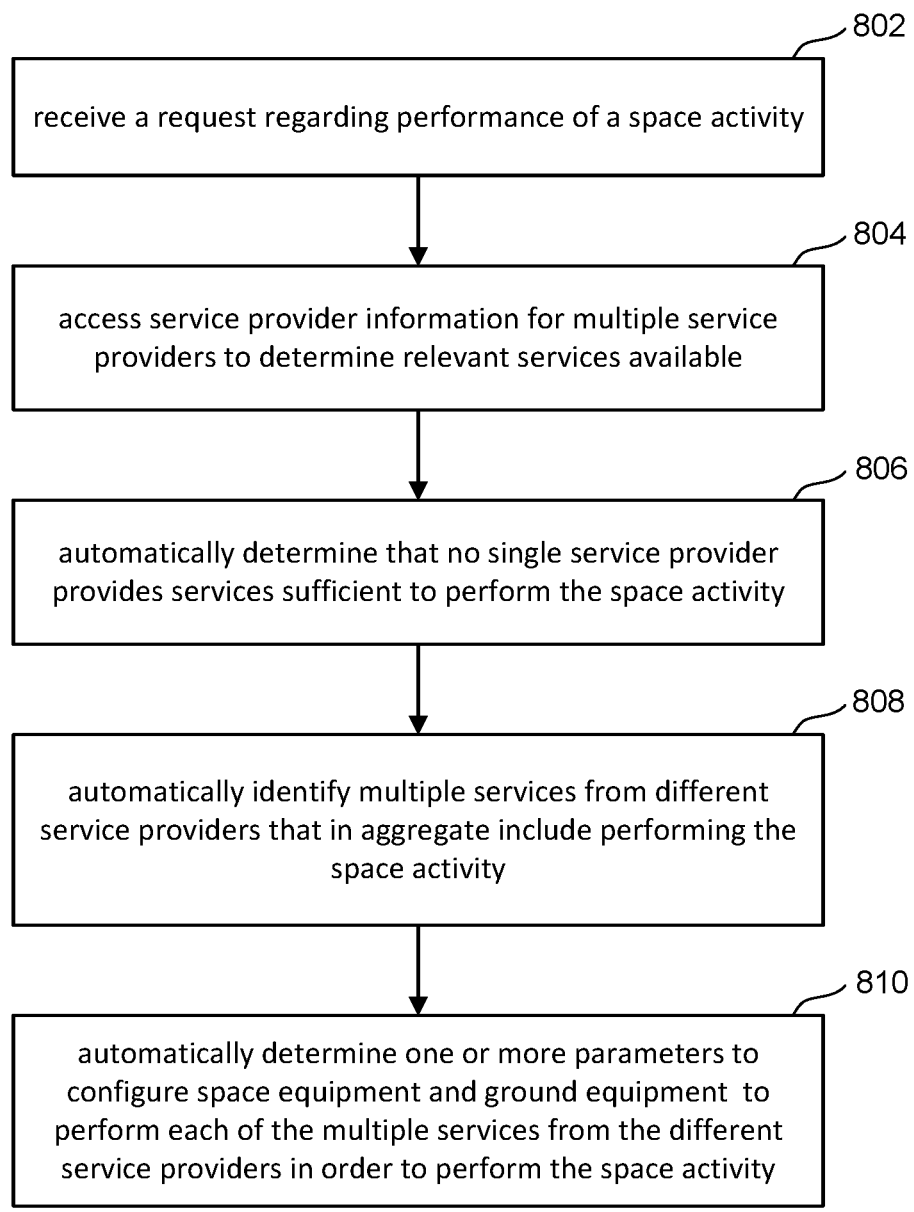
FIG. 8 is a flow chart describing one embodiment of a process for operating the system of FIG. 1.

FIG. 8 is a flow chart describing one embodiment of a machine implemented (automatic) process for operating aggregation server 100 in the system depicted in FIG. 1. The process of FIG. 8 represents one embodiment of an implementation of all or a portion of the process of FIG. 7. In step 802, aggregation server 100 receives a request regarding performance of a space activity. Step 802 corresponds to step 702 of FIG. 7. In step 804, aggregation server 100 accesses service provider information for multiple service providers to determine relevant systems/services available. Step 804 corresponds to step 704 of FIG. 7. In step 806, aggregation server 100 automatically determines that no single service provider provides services sufficient to perform the space activity. For example, if the request of step 802 was for communication services from Earth to Jupiter, step 806 may include aggregation server 100 determining that there is not already existing a single system from a service provider that provides communication services from Earth to Jupiter. In step 808, aggregation server 100 automatically identifies multiple services from different service providers that in aggregate include performing the space activity. The phrase "in aggregate include performing the space activity" is used herein to mean that the combination of the system/services can be used to perform the requested space activity as per the request of step 802. In the example where the request of step 802 was for communication services from Earth to Jupiter, and it was determined that there is not already existing a single system that provides communication services from Earth to Jupiter, then step 808 may include identifying a first system/service for communication between Earth and geosynchronous earth orbit, and a second system/service that includes a relay between geosynchronous earth orbit and Jupiter. Steps 806 and 808 correspond to step 706 of FIG. 7. In step 810 of FIG. 8, aggregation server 100 automatically determines one or more parameters to configure space equipment and ground equipment to perform each of the multiple services from the different service providers in order to perform the space activity. Step 810 corresponds to step 708 of FIG. 7. In some embodiments, after step 810 is performed, aggregation server 100 can perform (all of or a subset of) steps 710-724.

Figure 9:
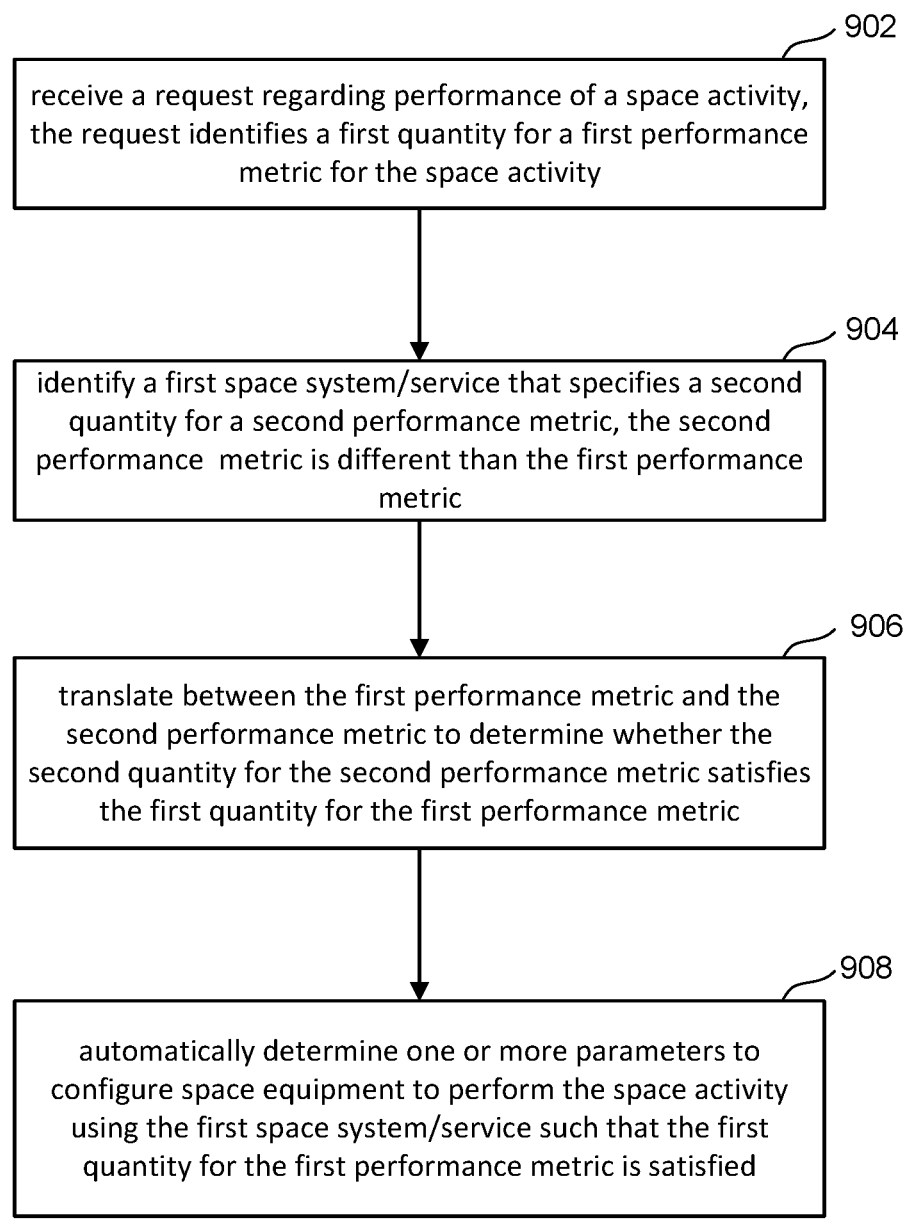
FIG. 9 is a flow chart describing one embodiment of a process for operating the system of FIG. 1.

FIG. 9 is a flow chart describing one embodiment of a machine implemented (automatic) process for operating aggregation server 100 in the system depicted in FIG. 1. The process of FIG. 9 represents one embodiment of an implementation of all or a portion of the process of FIG. 7. In step 902, aggregation server 100 receives a request regarding performance of a space activity. The request identifies a first quantity for a first performance metric for the space activity. In general, a performance metric is defined as figures and data representative of a system's actions, abilities, and overall quality. Examples of performance metrics include maximum power, minimum power, bandwidth, transmission speed, error rate, frequency range, etc. Step 902 corresponds to step 702 of FIG. 7. In step 904, aggregation server 100 identifies a first space system/service that specifies a second quantity for a second performance metric. The second performance metric is different than the first performance metric; therefore, aggregation server 100 needs to determine whether the second quantity for the second performance metric is at least equivalent to (or better) than first quantity for a first performance metric. In step 906, aggregation server 100 translates between the first performance metric and the second performance metric to determine whether the second quantity for the second performance metric satisfies the first quantity for the first performance metric. Consider an example where the request received in step 902 includes a requirement that video files be transferred for streaming from location A to location B at a predetermined quality. In this example, the first performance metric is video quality and the first quantity for the first performance metric is a particular video quality level/magnitude. Examples of the first quantity for the first performance metric include 4K video, 1080P, etc. However, the service provider who operates the satellite sells transponder bandwidth; therefore, the second performance metric is transponder bandwidth and the second quantity is a measure of transponder bandwidth (e.g., for a transponder on the satellite). In this example, step 906 comprises translating the video quality requirements to transponder bandwidth to verify that the video quality requirements are met (ie first performance metric is satisfied). In step 908, aggregation server 100 automatically determines one or more parameters to configure space equipment to perform the space activity using the first space system/service such that the first quantity for the first performance metric is satisfied. In some embodiments, after step 908 is performed, aggregation server 100 can perform (all of or a subset of) steps 710-724.

Figure 10:
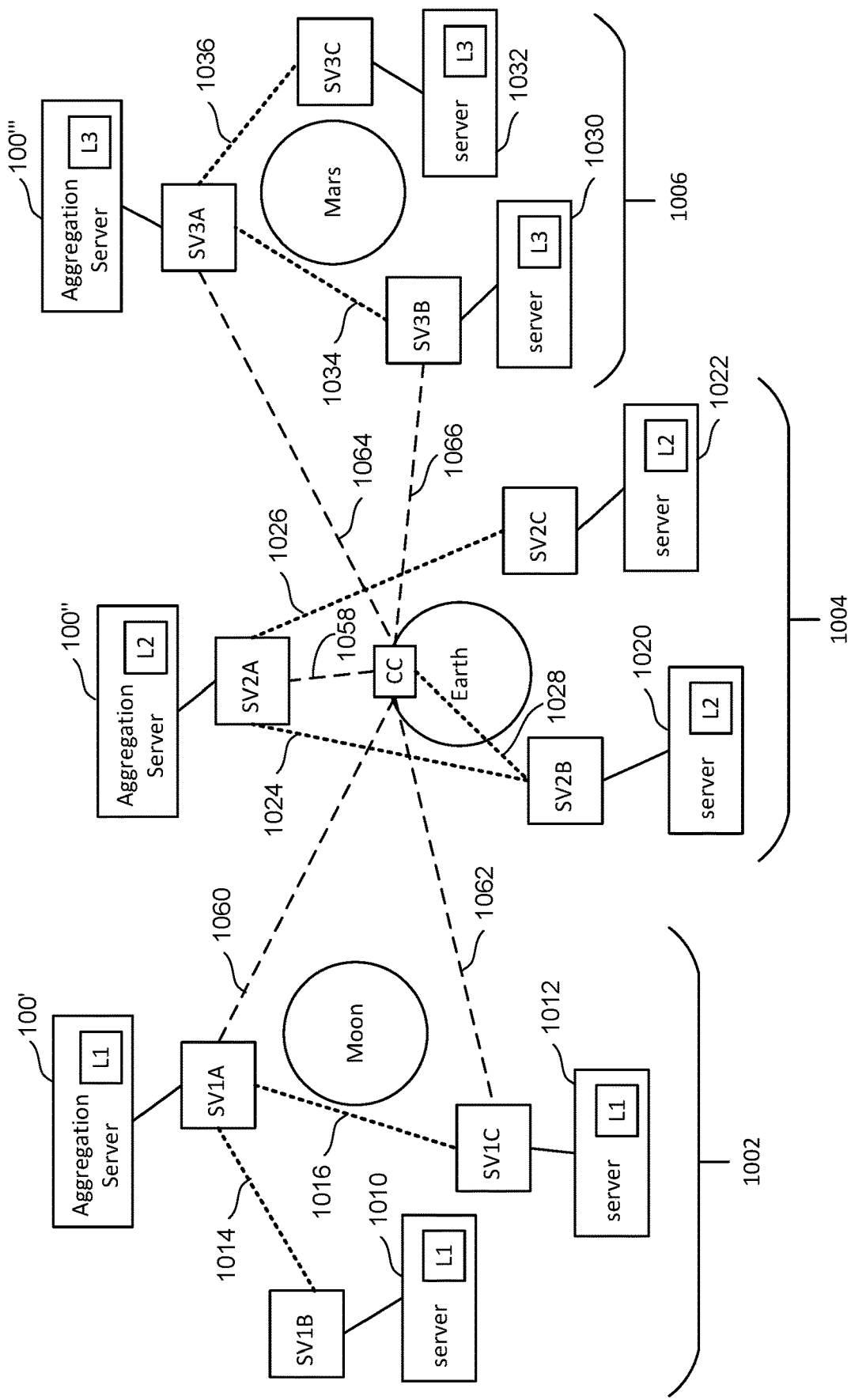
FIG. 10 is a block diagram of one embodiment of a space system that aggregates multiple systems/services to perform a space activity.

The technology described herein for aggregating systems/services is scalable across multiple regions that are remote from each other, for example, regions associated with different planets or moons (or other celestial objects). In some embodiments, each region will include its own local network. For example, FIG. 10 is a block diagram of one embodiment of a space system that aggregates multiple systems/services that includes three networks 1002, 1004 and 1006 that are remote from each other. Network 1002 is in proximity to the Moon. Network 1004 is in proximity to the Earth. Network 1004 is in proximity to Mars. Each of the networks comprises a plurality of space vehicles and servers. Each (or a subset) of the servers include a copy of a distributed ledger configured to store records. Each record identifies a transaction for a space service and contain a hash of a previous record to prevent records from being manipulated after committing. A record is committed in the respective network only with validation from and storage in ledgers of one or more other servers. In one embodiment, the ledgers implement block chain technology.

Network 1002 includes space vehicles SV1A, SV1B and SV1C, which can be satellites, space stations, relay stations, space based laboratories, transportation crafts, weather stations, etc. No particular type of space vehicle is required. Space vehicles SV1A, SV1B and SV1C are all in orbit around the Moon. Each (or a subset) of the space vehicles includes a server with a copy of a ledger. For example, space vehicle SV1B includes server 1010 having a copy of distributed ledger L1 and space vehicle SV1C includes server 1012 having a copy of distributed ledger L1. Space vehicle SV1A includes an instance of an aggregation server 100, identified in FIG. 10 as aggregation server 100'. In one embodiment, aggregation server 100' is the same structure and performs the same functions as aggregation server 100 discussed above. Aggregation server 100' includes a copy of distributed ledger L1. Aggregation server 100' performs the functions discussed above (e.g., see FIGS. 7-9) for network 1002. Space vehicle SV1A is in communication with space vehicle SV1B via proximity link 1014 (e.g., wireless RF or optical signal) and in communication with space vehicle SV1C via proximity link 1016.

Network 1004 includes space vehicles SV2A, SV2B and SV2C, which can be satellites, space stations, relay stations, space based laboratories, transportation crafts, weather stations, etc. No particular type of space vehicle is required. Space vehicles SV2A, SV2B and SV2C are all in orbit around the Earth. Each (or a subset) of the space vehicles includes a server with a copy of a ledger. For example, space vehicle SV2B includes server 1020 having a copy of distributed ledger L2 and space vehicle SV2C includes server 1022 having a copy of distributed ledger L2. Space vehicle SV2A includes an instance of an aggregation server 100, identified in FIG. 10 as aggregation server 100". In one embodiment, aggregation server 100" is the same structure and performs the same functions as aggregation server 100 discussed above. Aggregation server 100" includes a copy of distributed ledger L2. Aggregation server 100" performs the functions discussed above (e.g., see FIGS. 7-9) for network 1004. Space vehicle SV2A is in communication with space vehicle SV2B via proximity link 1024 (e.g., wireless RF or optical signal) and in communication with space vehicle SV2C via proximity link 1026. Network 1004 also includes a control center CC based on the Earth's surface; however, the control center can also be located in space. Space vehicle SV2B is in communication with control center cc via proximity link 1028.

Space vehicle SV2A (including aggregation server 100") is in communication with the control center CC via trunk link 1058 (e.g., a high bandwidth wireless RF or optical communication link optimized for long distance communication). Space vehicles SV1A and SV1C are also in communication with the control center CC via trunk links 1060 and 1062. In one embodiment, control center CC is an operations center that controls the various space vehicles and networks.

Network 1006 includes space vehicles SV3A, SV3B and SV3C, which can be satellites, space stations, relay stations, space based laboratories, transportation crafts, weather stations, etc. No particular type of space vehicle is required. Space vehicles SV3A, SV3B and SV3C are all in orbit around Mars. Each (or a subset) of the space vehicles includes a server with a copy of a ledger. For example, space vehicle SV3B includes server 1030 having a copy of distributed ledger L3 and space vehicle SV3C includes server 1032 having a copy of distributed ledger L3. Space vehicle SV3A includes an instance of an aggregation server 100, identified in FIG. 10 as aggregation server 100'''. In one embodiment, aggregation server 100''' is the same structure and performs the same functions as aggregation server 100 discussed above. Aggregation server 100''' includes a copy of distributed ledger L3. Aggregation server 100''' performs the functions discussed above (e.g., see FIGS. 7-9) for network 1006. Space vehicle SV3A is in communication with space vehicle SV3B via proximity link 1044 (e.g., wireless RF or optical signal) and in communication with space vehicle SV3C via proximity link 1036. Space vehicles SV3A and SV3B are in communication with the control center CC via trunk links 1064 and 1066.

Because of the distance between networks and the orbiting of planets and moons, some pairs of networks may be in intermittent communication with each other while other pairs of networks are in full time communication with each other. For example, network 1004 is only in intermittent communication with network 1006 such that there are connection times when network 1004 is in communication with network 1006 and there are quiet times when network 1004 is not in communication with network 1006. In the example topography of FIG. 10, connection times include those time when space vehicle SV2A is in communication with control center CC via trunk line 1058 and space vehicle SV3A is in communication with control center CC via trunk line 1064. During connections times when network 1004 is in communication with network 1006, aggregation server 100" can synchronize with aggregation server 100''' via control center CC, where such synchronizing includes ledger L2 synchronizing with ledger L3. During quiet times, no synchronization occurs.

In one embodiment, the ledgers of different networks will have a common set of records that are stored in the ledgers of the different networks and the ledgers will have separate records that are stored in ledgers of only one (or a subset) of the networks. For example, a common set of records have security that allows storage in the ledgers L2 of network 1004 and ledgers L3 of network 1006. One or more separate sets of records have security that allows storage in the ledgers L2 of network 1004 and not in ledgers L3 of network 1006. One or more separate sets of records have security that allows storage in the ledgers L3 of network 1006 and not in ledgers L2 of network 1004. Ledgers L2 of network 1004 synchronize the common set of records with ledgers L3 of network 1006 during connection times (via a synchronization process between aggregation servers 100" and 100''' through control center CC) and do not synchronize the common set of records with ledgers L3 of network 1006 during quiet times.

Figure 11:
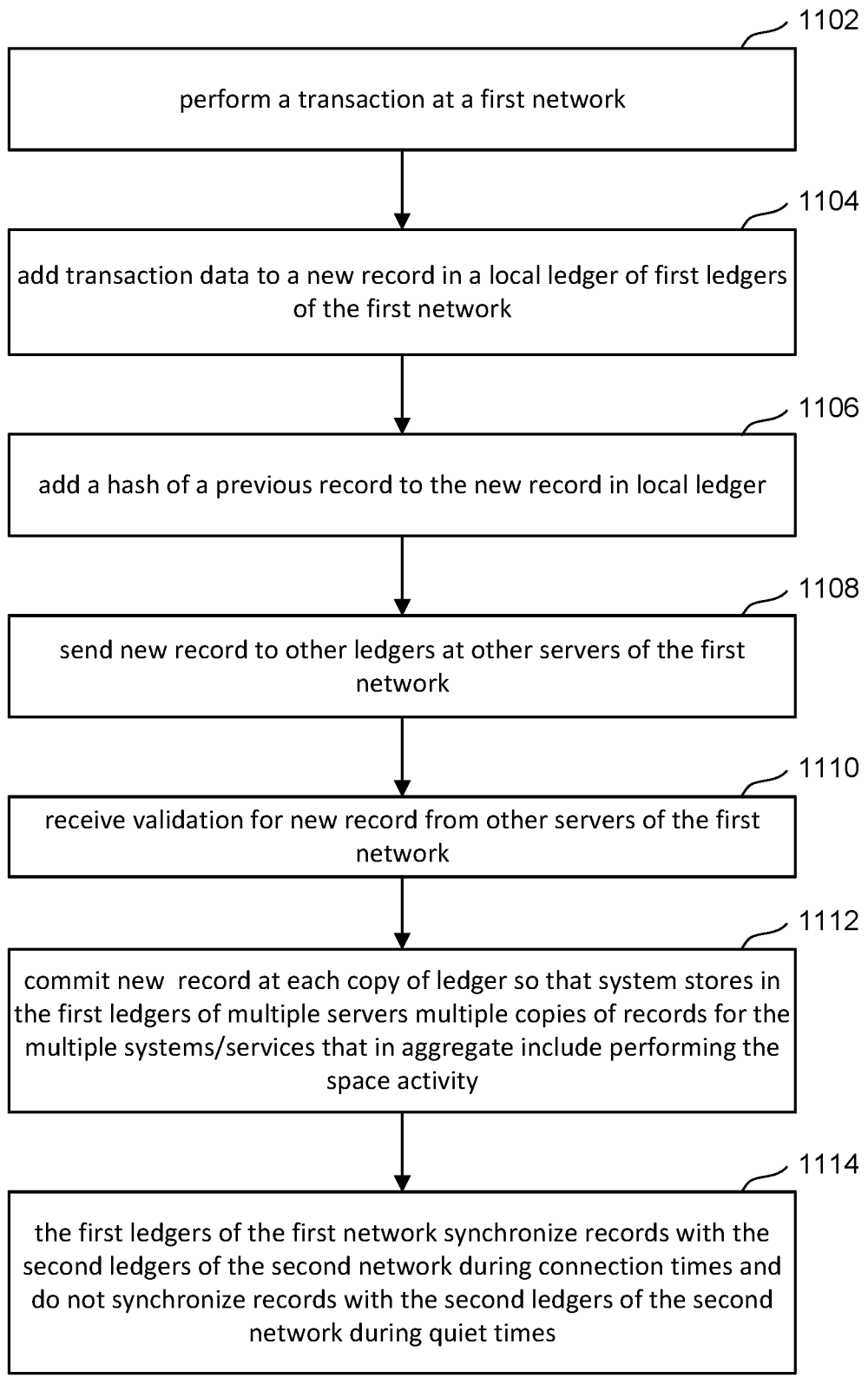
FIG. 11 is a flow chart describing one embodiment of a process for operating the system of FIG. 10.

FIG. 11 is a flow chart describing one embodiment of a machine implemented (automatic) process for operating the system of FIG. 10. In step 1102, an aggregation server (e.g., aggregation server 100',100" or 100''') for a first network (e.g., network 1002, 1004 or 1006) performs a transaction for the first network. For example, in response to a request received from a client server, an aggregation server may provision a system/service from a service provider for the client server. Step 1102 can include performing all of part of the processes of FIGS. 7, 8 and/or 9. One example transaction can include provisioning a satellite communication link. In step 1104, data for the transaction (referred to as transaction data) is added to a new record in a local ledger (e.g., L1, L2 or L3) for the first network. In step 1106, the aggregation server for the first network adds a hash of a previous record to the new record in the local ledger. In step 1108, this newly created record is sent to the ledgers at other servers in the same network. For example, if the first network of FIG. 11 corresponds to network 1004 of FIG. 10, then step 1108 includes aggregation server 100''' sending a copy of the newly created record to server 1030 for storage in its copy of ledger L3 and to server 1032 for storage in its copy of ledger L3. Once each of the other servers store the new records and confirm authenticity, then the other servers send a validation of the record back to the aggregation server. Thus, in step 1110, the aggregation server for the first network receives validation for the new record from the other servers of the first network. In step 1112, in response to the validations for the new record from one or more of the other servers, the servers for the first network commit the new record at each copy of the ledger. Thus, the system stores in the ledgers of multiple servers multiple copies of records for the multiple systems/services that in aggregate include performing the space activity. Steps 1102-1112 can be performed by a network in a multi-network system such as depicted in FIG. 10 and/or can be performed by a network in a single network system such as depicted in FIG. 1. In step 1114, the ledgers of the first network (e.g., ledgers L3 of network 1004) synchronize records with the ledgers of a second network (e.g., ledgers L2 of network 1002) during connection times and do not synchronize records with the ledgers of the second network during quiet times, as discussed above.

A system for aggregating spaced related systems has been described.

One embodiment includes a machine implemented method, comprising: receiving a request regarding performance of a space activity; accessing service provider information for multiple service providers to determine relevant services available; automatically determining that no single service provider provides services sufficient to perform the space activity; automatically identifying multiple services from different service providers that in aggregate include performing the space activity; and automatically determining a parameter to configure space equipment to perform each of the multiple services from the different service providers in order to perform the space activity.

One embodiment includes a non-transitory computer readable storage medium storing software code which when executing on one or more processors performs a method, the processor readable code comprising resource controller code, ground equipment interface code, space equipment interface code, policy management code and mission management interface code. The resource controller code implements a resource controller configured to: receive a request regarding performance of a space related activity, access service provider information for multiple service providers to determine relevant services available, determine that no single service provider provides services sufficient to perform the space related activity, and identify multiple services from different service providers that in aggregate include performing the space related activity. The ground equipment interface code implements a ground equipment interface which is in communication with the resource controller and ground equipment that communicates with equipment in space. The space equipment interface code implements a space equipment interface that is in communication with the resource controller. The policy management code implements a policy manager that is in communication with the resource controller and space equipment. The policy manager restricts services that can be used by the resource controller based policy criteria. The mission management interface code implements a mission management interface which is in communication with the resource controller and an external mission manager server.

One embodiment includes a machine implemented method comprising: receiving a request regarding performance of a space activity, the request identifies a first quantity for a first performance metric for the space activity; identifying a first space service that specifies a second quantity for a second performance metric, the second performance metric is different than the first performance metric; translating between the first performance metric and the second performance metric to determine whether the second quantity for the second performance metric satisfies the first quantity for the first performance metric; and automatically determining a parameter to configure space equipment to perform the space activity using the first space service such that the first quantity for the first performance metric is satisfied.

One embodiment includes a first network in proximity to a first planet or moon, the first network comprises a first set of one or more space vehicles and a first set of servers that each include a first ledger, each of the first ledgers of the first set of servers are configured to store records that identify a transaction for a space service and contain a hash of a previous record to prevent records from being manipulated after committing, a record is committed in the first network only with validation from and storage in first ledgers of multiple servers of the first set of servers; and a second network in proximity to a second planet or moon, the second network comprises a second set of one or more space vehicles and a second set of servers that each include a second ledger, each second ledger of the second set of one or more servers are configured to store records that identify a transaction for a space service and contain a hash of a previous record to prevent records from being manipulated after committing, a record is committed in the second network only with validation from and storage in second ledgers of multiple servers of the second set of servers, the second planet or moon is remote from the first planet or moon, the second network is only in intermittent communication with the first network such that there are connection times when the second network is in communication with the first network and there are quiet times when second network is not in communication with the first network, a common set of records have security that allows storage in the first network and the second network, one or more separate sets of records have security that allows storage in the first network and not the second network, the second ledgers of the second network synchronize the common set of records with the first ledgers of the first network during connection times and do not synchronize the common set of records with the first ledgers of the first network during quiet times. In one example implementation, the first ledgers and the second ledgers are blockchains, and each transaction identifies a service, a security policy, a service level agreement and another contract term.

One embodiment includes a processor connected to a storage device (e.g., memory, hard disk drive, solid state drive, other type of flash memory) and a communication interface. The storage device (a non-transitory computer readable storage medium) stores code to program the processor to perform the methods described above.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A machine implemented method for space systems, comprising:
   receiving a request regarding performance of a space activity;
   accessing service provider information for multiple service providers to determine relevant services available;
   identifying multiple services from different service providers that in aggregate include performing the space activity;
   determining a parameter to configure space equipment to perform at least one of the multiple services in order to perform the space activity, the space activity is performed in a first network in proximity to a first planet or moon, the first network comprises a first set of one or more space vehicles and a first set of servers that each include a first ledger, each of the first ledgers of the first set of servers are configured to store records that identify a transaction for a space service, the first network is remote from a second network, the second network is in proximity to a second planet or moon, the second network comprises a second set of one or more space vehicles and a second set of servers that each include a second ledger, each second ledger of the second set of one or more servers are configured to store records that identify a transaction for a space service; and
   storing in first ledgers of multiple servers of the first set of servers copies of a first set of one or more records for at least a subset of the multiple services that are included in performing the space activity; and
   the first ledgers of the first network synchronizing the first set of one or more records with the second ledgers of the second network.

2. The machine implemented method of claim 1, wherein the space equipment includes ground based equipment and space based equipment, the method further comprising:
   communicating with the ground based equipment;
   communicating with the space based equipment;
   implementing a security policy for the request; and
   interfacing with a mission manager server.

3. The machine implemented method of claim 1, wherein:
   the determining the parameter to configure space equipment includes using the parameter to configure the space equipment to perform the space activity using a first space service.

4. The machine implemented method of claim 1, wherein:
   the request identifies a first quantity for a first performance metric;
   the identifying multiple services from different service providers that in aggregate include performing the space activity includes:
      identifying a first space service that specifies a second quantity for a second performance metric that is different than the first performance metric, and
      translating between the first performance metric and the second performance metric to determine whether the second quantity for the second performance metric satisfies the first quantity for the first performance metric; and
   the determining the parameter includes automatically determining the parameter to configure space equipment to perform the space activity using the first space service such that the first quantity for the first performance metric is satisfied.

5. The machine implemented method of claim 4, wherein:
   the determining the parameter includes using the parameter to configure space equipment to perform the space activity using the first space service such that the first quantity for the first performance metric is satisfied; and
   the method further comprises monitoring the first space service to verify that first quantity for the first performance metric is satisfied.

6. The machine implemented method of claim 1, wherein:
   the determining the parameter to configure space equipment comprises determining a link budget for communication between space equipment.

7. The machine implemented method of claim 1, further comprising:
   monitoring the multiple services;
   determining a fault condition in a first service of the multiple services;
   automatically identifying an alternative service to the first service; and
   automatically determining an update to the parameter to reconfigure the space equipment to perform the space activity using the alternative service in lieu of the first service.

8. The machine implemented method of claim 1, further comprising:
   monitoring the multiple services;
   determining a fault condition in a first service of the multiple services; and
   automatically determining an update to the parameter to reconfigure the space equipment to perform the first service after the fault condition.

9. The machine implemented method of claim 1, wherein:
   each of the first ledgers of the first set of servers are configured to store records that identify a transaction for a space service and contain a hash of a previous record to prevent records from being manipulated after committing, a record is committed in the first network only with validation from and storage in first ledgers of multiple servers of the first set of servers, each second ledger of the second set of one or more servers are configured to store records that identify a transaction for a space service and contain a hash of a previous record to prevent records from being manipulated after committing, a record is committed in the second network only with validation from and storage in second ledgers of multiple servers of the second set of servers, the second network is only in intermittent communication with the first network such that there are connection times when the second network is in communication with the first network and there are quiet times when second network is not in communication with the first network, a common set of records have security that allows storage in the first network and the second network; and
   the first ledgers of the first network synchronize the first set of one or more records with the second ledgers of the second network during connection times and do not synchronize the first set of one or more records with the second ledgers of the second network during quiet times.

10. A machine implemented method for space systems, comprising:

receiving a request regarding performance of a space activity;

accessing service provider information for multiple service providers to determine relevant services available;

automatically determining that no single service provider provides services sufficient to perform the space activity;

automatically identifying multiple services from different service providers that in aggregate include performing the space activity;

automatically determining a parameter to configure space equipment to perform the multiple services from the different service providers in order to perform the space activity, wherein the receiving a request and determining the parameter are performed in a first network in proximity to a first planet or moon, the first network comprises a first set of one or more space vehicles and a first set of servers that each include a first ledger, each of the first ledgers of the first set of servers are configured to store records that identify a transaction for a space service and contain a hash of a previous record to prevent records from being manipulated after committing, a record is committed in the first network only with validation from and storage in first ledgers of multiple servers of the first set of servers; and storing in first ledgers of multiple servers of the first set of servers multiple copies of a first set of one or more records for the multiple services that in aggregate include performing the space activity.

11. The machine implemented method of claim 10, wherein the first ledgers are blockchains; and each transaction identifies a service, a security policy, a service level agreement and another contract term.

12. The machine implemented method of claim 1, wherein:

the space equipment includes a satellite and a ground terminal;

the space activity includes wireless communication between the satellite and the ground terminal; and the determining a parameter includes determining at least one parameter related to a link budget for the ground terminal.

13. The machine implemented method of claim 1, wherein:

the second network is only in intermittent communication with the first network such that there are connection times when the second network is in communication with the first network and there are quiet times when second network is not in communication with the first network; and the first ledgers of the first network synchronizing the first set of one or more records with the second ledgers of the second network during connection times and do not synchronize the first set of one or more records with the second ledgers of the second network during quiet times.

14. A machine implemented method comprising:

receiving a request regarding performance of a space activity, the request identifies a first quantity for a first performance metric for the space activity;

identifying a first space service that specifies a second quantity for a second performance metric, the second performance metric is different than the first performance metric;

translating between the first performance metric and the second performance metric to determine whether the second quantity for the second performance metric satisfies the first quantity for the first performance metric; and automatically determining a parameter to configure space equipment to perform the space activity using the first space service such that the first quantity for the first performance metric is satisfied.

15. The machine implemented method of claim 14, wherein:

the automatically determining the parameter includes using the parameter to configure the space equipment to perform the space activity using the first space service.

16. The machine implemented method of claim 14, wherein:

the automatically determining the parameter includes determining a link budget for communication between space equipment.

17. The machine implemented method of claim 14, further comprising:

monitoring the first space service;

determining a fault condition in the first space service;

identifying a second space service that satisfies the first quantity for the first performance metric; and automatically updating the parameter to reconfigure the space equipment to perform the space activity using the second space service such that the first quantity for the first performance metric is satisfied.

18. The machine implemented method of claim 14, further comprising:

monitoring the space service;

determining a fault condition in the first space service; and automatically updating the parameter to reconfigure the space equipment to perform the space service after the fault condition such that the first quantity for the first performance metric is satisfied.

19. A system comprising:

a first network in proximity to a first planet or moon, the first network comprises a first set of one or more space vehicles and a first set of servers that each include a first ledger, each of the first ledgers of the first set of servers are configured to store records that identify a transaction for a space service and contain a hash of a previous record to prevent records from being manipulated after committing, a record is committed in the first network only with validation from and storage in first ledgers of multiple servers of the first set of servers; and a second network in proximity to a second planet or moon, the second network comprises a second set of one or more space vehicles and a second set of servers that each include a second ledger, each second ledger of the second set of one or more servers are configured to store records that identify a transaction for a space service and contain a hash of a previous record to prevent records from being manipulated after committing, a record is committed in the second network only with validation from and storage in second ledgers of multiple servers of the second set of servers, the second planet or moon is remote from the first planet or moon, the second network is only in intermittent communication with the first network such that there are connection times when the second network is in communication with the first network and there are quiet times when second network is not in communication with the first network, a common set of records have security that allows storage in the first network and the second network, one or more separate sets of records have security that allows storage in the first network and not the second network, the second ledgers of the second network synchronize the common set of records with the first ledgers of the first network during connection times and do not synchronize the common set of records with the first ledgers of the first network during quiet times.

20. The system of claim 19, wherein:

the first ledgers and the second ledgers are blockchains; and each transaction identifies a service, a security policy, a service level agreement and another contract term.

* * * * *

UNITED STATES PATENT AND TRADEMARK OFFICE
CERTIFICATE OF CORRECTION

PATENT NO. : 11,483,061 B2
APPLICATION NO. : 17/110127
DATED : October 25, 2022
INVENTOR(S) : J. Pham et al.

It is certified that error appears in the above-identified patent and that said Letters Patent is hereby corrected as shown below:

In the Claims

Column 22, Line 56 (Claim 9, Line 20) please change "when second" to -- when the second --.
Column 23, Lines 49-50 (Claim 13, Lines 6-7) please change "when second" to -- when the second --.
Column 24, Line 64 (Claim 19, Line 28) please change "when second" to -- when the second --.

Signed and Sealed this
Twenty-eighth Day of March, 2023

Katherine Kelly Vidal
*Director of the United States Patent and Trademark Office*